United States Patent
Inoue et al.

(10) Patent No.: US 7,319,696 B2
(45) Date of Patent: Jan. 15, 2008

(54) COMMUNICATION APPARATUS AND RELAY APPARATUS FOR PERFORMING PACKET PRIORITY CONTROL

(75) Inventors: Rumiko Inoue, Kawasaki (JP); Satoshi Tsuchiya, Kawasaki (JP); Koichi Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1022 days.

(21) Appl. No.: 10/162,793

(22) Filed: Jun. 5, 2002

(65) Prior Publication Data

US 2003/0128708 A1    Jul. 10, 2003

(30) Foreign Application Priority Data

Jan. 10, 2002    (JP) ............................. 2002-002912

(51) Int. Cl.
*H04L 12/56* (2006.01)
(52) U.S. Cl. .................................. 370/392; 370/395.42
(58) Field of Classification Search ..................... None
See application file for complete search history.

(56) References Cited

U.S. PATENT DOCUMENTS

| | | | |
|---|---|---|---|
| 6,735,175 B1 * | 5/2004 | Havens | 370/236 |
| 6,944,678 B2 * | 9/2005 | Lu et al. | 709/245 |
| 6,973,085 B1 * | 12/2005 | Acharya | 370/392 |
| 2005/0117576 A1 * | 6/2005 | McDysan et al. | 370/389 |
| 2005/0283734 A1 * | 12/2005 | Santoro et al. | 715/765 |

FOREIGN PATENT DOCUMENTS

JP     09-205461     8/1997

* cited by examiner

*Primary Examiner*—Huy D. Vu
*Assistant Examiner*—Rhonda Murphy
(74) *Attorney, Agent, or Firm*—Katten Muchin Rosenman LLP

(57) ABSTRACT

In a communication system, a first communication apparatus includes: an application data generating unit for generating application data including data at an application level and a priority at the application level; and a lower-level packet generating unit disposed therein for generating a packet by adding to the application data a header including a destination address and a source address at a level lower than the application level. A first relay apparatus includes: a priority identifying unit disposed therein for determining whether or not a priority is set in the application data of the packet received by the first relay apparatus, and thereby identifying a first priority at the application level; and a priority control unit disposed therein for renewing a TOS field value in the header of the packet, the header being at the level lower than the application level, on the basis of the first priority.

6 Claims, 7 Drawing Sheets

MAC HEADER | IP HEADER | TCP HEADER | APPLICATION DATA

0 | 0 | 0

XML DESCRIPTION
(INDICATING PRIORITY)

EXAMPLE OF XML DESCRIPTION

⟨SOAP-ENV:Header⟩
　　⟨t:Priority xmlns:t="some-URL"⟩
20
　⟨/t:priority⟩⟨/SOAP-ENV:Header⟩

| PRIORITY | TOS VALUE |
|---|---|
| 0～5 | 1 |
| 6～10 | 2 |
| 11～15 | 3 |
| 16～20 | 4 |
| 21～25 | 5 |
| 26～30 | 6 |
| 31～35 | 7 | ced
COMMUNICATION APPARATUS AND RELAY APPARATUS FOR PERFORMING PACKET PRIORITY CONTROL

BACKGROUND OF THE INVENTION

1. Field of the Invention

The present invention relates to packet priority control.

2. Description of the Related Art

With the rapid expansion of the Internet, there have been more cases of business done by using the Internet to transmit and receive packets between a client and a server, such as electronic commerce. A packet transmitted by the client is delivered to the server via a router or the like. In this case, when the network is congested, the router discards the packet so as to avoid the congestion. In mail-order selling of products and the like, however, there are packets that are desired to be delivered to the server and the client without fail, such as a packet for ordering a product and a packet for confirming the order. Such packets need priority control, in which the packets are transferred before other packets.

As a priority control technique of the client and the server, there is a method of transmitting a transmission packet with a value indicating priority included in a TOS field (layer 3) of the packet. TOS is a field related to priority transfer control included in an IP packet header specified by the Internet Protocol (RFC 791). Priority control techniques of the router include: (i) a technique of making priority transfer on the basis of the priority in the TOS field; (ii) a technique of making priority transfer by determining a priority on the basis of a static or dynamic policy of the router itself; and (iii) a technique of making priority transfer by determining a priority on the basis of the static or dynamic policy of the router itself and then rewriting the TOS field value of the packet to be transferred.

With the conventional priority control techniques, however, it is difficult for the user of the server or the client to make the setting in the TOS field of an IP packet at an application level, and therefore it is in effect difficult for the user of the server or the client to set a priority. Thus, the user of the server or the client cannot specify a packet desired to be given priority for priority control. Thus, since even when the router can make priority transfer on the basis of the TOS value, it is difficult to set the TOS value at the application level, it is not possible to make priority transfer of a packet desired by the user of the client or the server.

SUMMARY OF THE INVENTION

It is accordingly an object of the present invention to provide a communication apparatus that makes it possible to set a priority in a packet at the application level and a relay apparatus for relaying the packet.

In accordance with an aspect of the present invention, there is provided a communication apparatus for transmitting and receiving a packet, the communication apparatus including: a packet receiving unit for receiving a packet; an application data generating unit for generating application data including data at an application level and a priority at the application level based on importance of the data; a lower-level packet generating unit for generating a packet by adding to the application data a header including a destination address and a source address at a level lower than the application level; and a packet transmitting unit for transmitting the packet.

In accordance with another aspect of the present invention, there is provided a relay apparatus for relaying a packet, the relay apparatus comprising: a packet receiving unit for receiving a packet; a priority identifying unit for determining whether a priority is included in application data at an application level from the packet received by the packet receiving unit, and thereby identifying a first priority at the application level; a priority control unit for renewing a field value for packet priority control in a header of the packet, the header being at a level lower than the application level, on the basis of the first priority; and a packet transmitting unit for transmitting the packet.

Preferably, the priority control unit has a policy table in which a second priority is set for each source address or each destination address, searches the policy table for a source address or a destination address of the packet to determine a corresponding second priority, calculates a third priority from the second priority and the first priority of the packet, and sets a TOS field value corresponding to the third priority in a TOS field.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
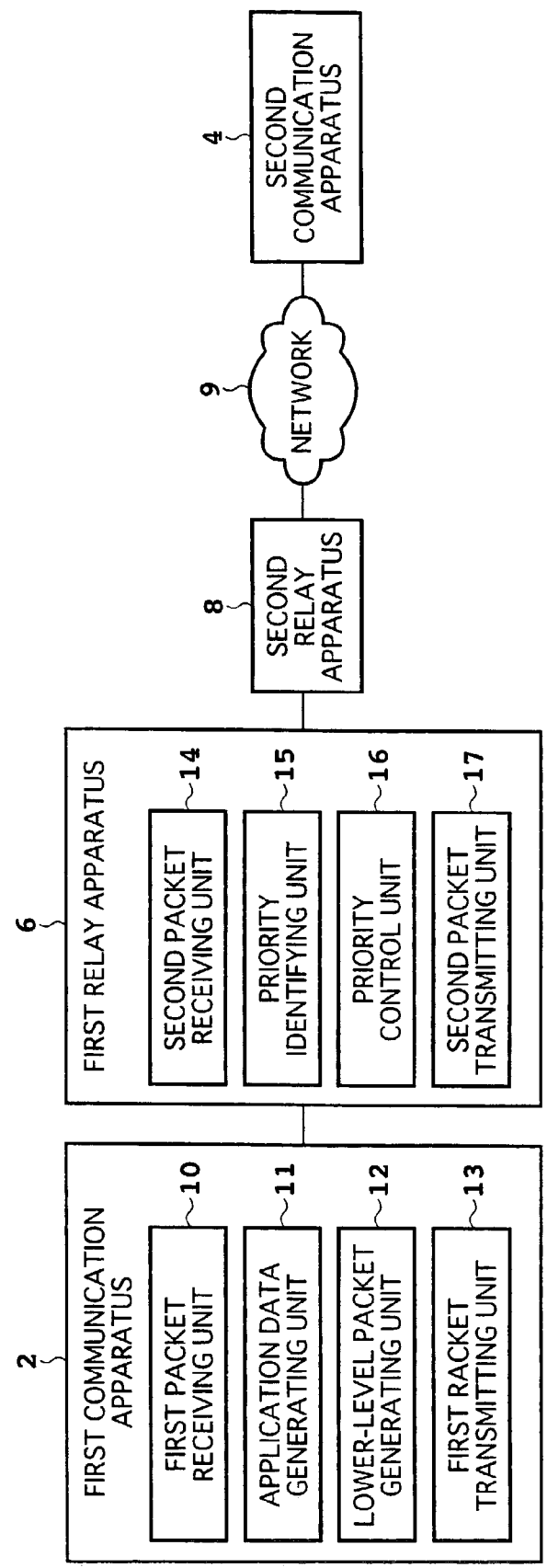
FIG. 1 is a diagram of assistance in explaining principles of the present invention.

Principles of the present invention will be described prior to description of preferred embodiments of the present invention. FIG. 1 is a diagram of assistance in explaining principles of the present invention. As shown in FIG. 1, a communication system is formed by a first communication apparatus 2, a second communication apparatus 4, a first relay apparatus 6, a second relay apparatus 8, and a network 9. The first communication apparatus 2 has a first packet receiving unit 10, an application data generating unit 11, a lower-level packet generating unit 12, and a first packet transmitting unit 13. The first relay apparatus 6 has a second packet receiving unit 14, a priority identifying unit 15, a priority control unit 16, and a second packet transmitting unit 17. When the first communication apparatus 2 transmits a packet to the second communication apparatus 4, the application data generating unit 11 generates application data including data at an application level and a priority at the application level based on importance of the data. The lower-level packet generating unit 12 generates a packet by adding to the application data a header having an address of the first communication apparatus 2 as a source address and an address of the second communication apparatus 4 as a destination address at a level lower than the application level. The first packet transmitting unit 13 transmits the packet.

The second packet receiving unit 14 in the first relay apparatus 6 receives the packet transmitted by the first communication apparatus 2. The priority identifying unit 15 determines from the packet received by the second packet receiving unit 14 whether a priority is set in the application data of the application level, to thereby identify a first priority at the application level. On the basis of the first priority, the priority control unit 16 renews a field value for packet priority control in the packet header of the level lower than the application level. The second packet transmitting unit 17 transmits the packet. The second relay apparatus 8 receives the packet transmitted by the first relay apparatus 6, and then effects priority transfer control on the basis of the field value for packet priority control in the packet header of the lower level, for example a TOS field value. The packet transmitted by the second relay apparatus 8 is received by the second communication apparatus 4 via the network 9.

Figure 2:
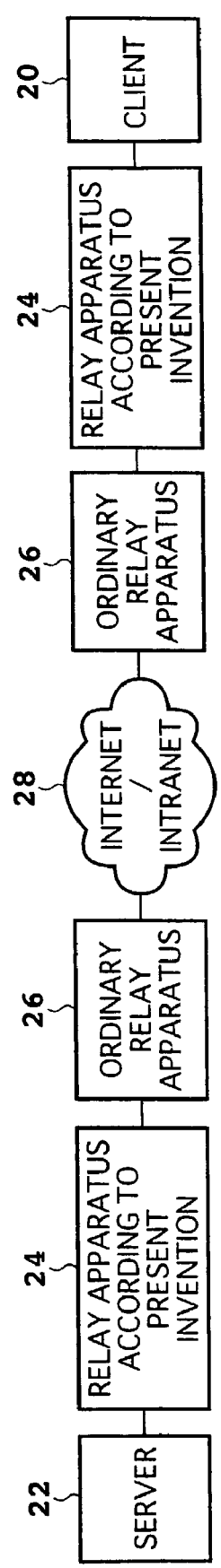
FIG. 2 is a diagram of a configuration of a network according to an embodiment of the present invention.
Figure 3:
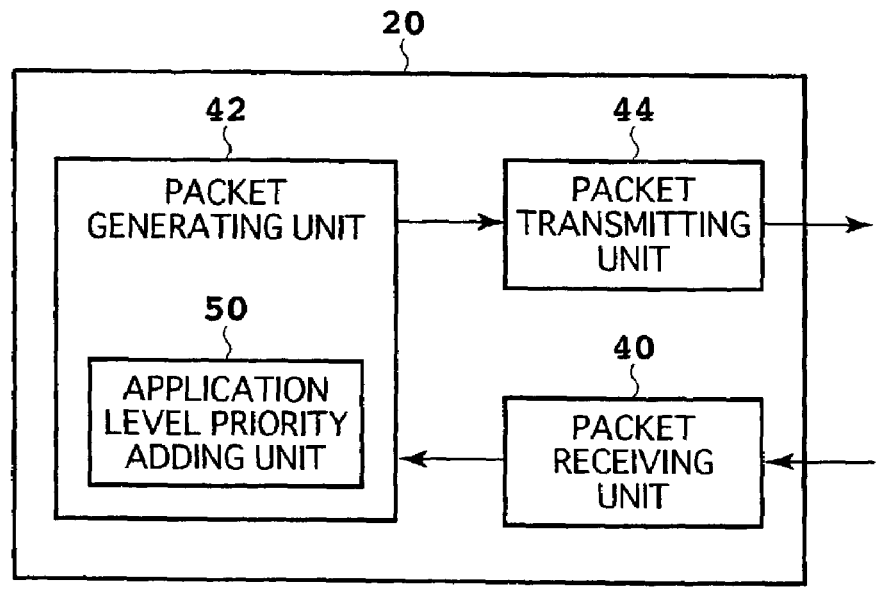
FIG. 3 is a diagram of a configuration of a client in FIG. 2.

FIG. 2 is a block diagram of a network according to an embodiment of the present invention. The network shown in FIG. 2 allows packet communication via an Internet/intranet 28 between a client 20 and a server 22. The network has relay apparatus according to the present invention (relay apparatus) 24, ordinary relay apparatus (routers) 26, and the Internet/intranet 28 disposed between the client 20 and the server 22. The client 20, which transmits and receives packets to and from the server 22, is a terminal apparatus such as a personal computer having application programs. The client 20 has a packet to be transmitted by priority transfer. Packets intended for priority transfer may be all packets to be transmitted by the client 20 to the server 22, or may be packets that have different priorities depending on the importance of the packets. The present embodiment assumes an Internet mail-order application, and a plurality of priorities for packets to be transmitted to the server 22. FIG. 3 is a functional block diagram of the client 20 in FIG. 2. As shown in FIG. 3, the client 20 includes a packet receiving unit 40, a packet generating unit 42, and a packet transmitting unit 44. The packet receiving unit 40 performs the following processing. (1) Receiving a MAC frame directed to its terminal from a communication cable not shown in the figure. (2) Extracting application data at an application level from the MAC frame, and outputting the application data to the packet generating unit 42.

Figure 4:
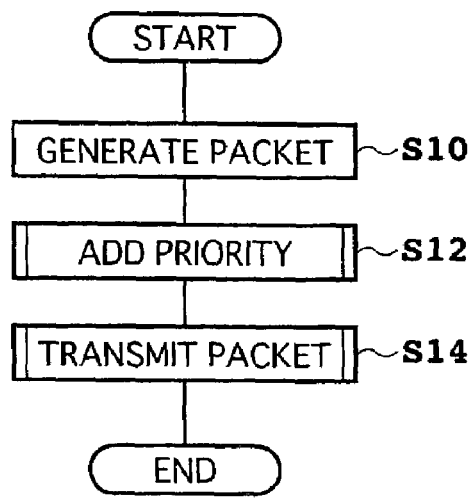
FIG. 4 is a flowchart of packet transmission.

FIG. 4 is a flowchart of packet transmission. At a step S10, the packet generating unit 42 generates application data according to the packet outputted to the packet generating unit 42 or an instruction from a user. At a step S12, an application level priority adding unit 50 in the packet generating unit 42 sets a priority in the application data. Methods for setting the priority include: (i) a method of setting the priority between the client 20 and the server 22 according to a special format; and (ii) a method of setting the priority according to a standard format. The latter includes a method of setting the priority according to an HTML format and a method of setting a priority tag according to an XML format, for example. In the HTML format, a command description is determined and there is no extensibility. The HTML format requires the priority to be set in a predetermined position, thus limiting priority setting. The XML format has a command extensibility, thus facilitating the setting of a new command by a tag.

Figures 5, 6:
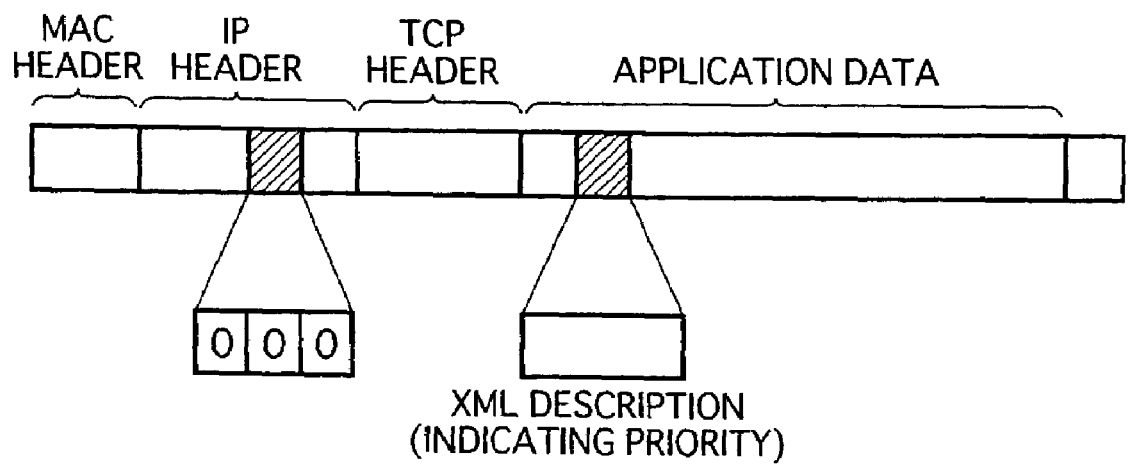
FIG. 5 is a diagram showing a packet format.
FIG. 6 is a diagram showing a priority indicated by an XML description.

FIG. 5 is a diagram showing a packet format. As shown in FIG. 5, a packet is formed of a MAC header, an IP header, a TCP header, and application data. The MAC header is a MAC frame header in which a source MAC address, a destination MAC address and the like are set. The IP header is a header in which a source IP address, a destination IP address, a TOS value and the like are set. The TCP header is a header in which a port number and the like are set. The data is set at the application level, and is described in the XML format. The data includes a priority described in the XML format.

FIG. 6 is a diagram showing a priority indicated by an XML description. As shown in FIG. 6, a priority tag is set by SOAP in the header, and the line is followed by a priority, for example 20. The SOAP (Simple Object Access Protocol) uses XML technology for exchanging information between applications, between various apparatus and the like, and is useful especially in exchanging information between applications on the Internet (transaction processing). The SOAP enables applications on the Internet (Web services) to converse with each other without human intervention and perform processing automatically. The part xmlns="some-URL" indicates the URL of a page storing a description of the priority tag, but can be omitted. The priority is information indicating the priority of a packet, and for example assumes a value in a range of 0 to 20 with 0 being a lowest priority and 20 being a highest priority. In the case of Internet mail order, the priority of a shopping order is set at 20, the priority of shopping product reference is set at 10, and the priority of others is set at 0. When packets have two priorities, that is, priority and non-priority, priority may not be set for non-priority packets.

At a step S14, the packet transmitting unit 44 adds a TCP header, an IP header, and a MAC header to a packet outputted from the packet generating unit 42, and then transmits the resulting packet to a communication cable not shown in the figure. The server 22, which transmits and receives packets to and from the client 20, is a communication apparatus such as a workstation having an application program for Internet mail order. The server 22 has a packet to be transmitted by priority transfer. Functional blocks of the server 22 for generating, transmitting, and receiving packets are configured in the same manner as in the client 20 of FIG. 3. The relay apparatus 24 effect priority transfer control at the application level of a packet and relay the packet. The relay apparatus 24 may be connected directly to the client 20 and the server 22, as shown in FIG. 2, or may be provided on the Internet/intranet 28. The direct connection of the client 20 and the server 22 to the relay apparatus 24 as shown in FIG. 2 is effective because the relay apparatus 24 can effect priority control on packets transmitted from the client 20 and the server 22 at an early stage.

Figure 7:
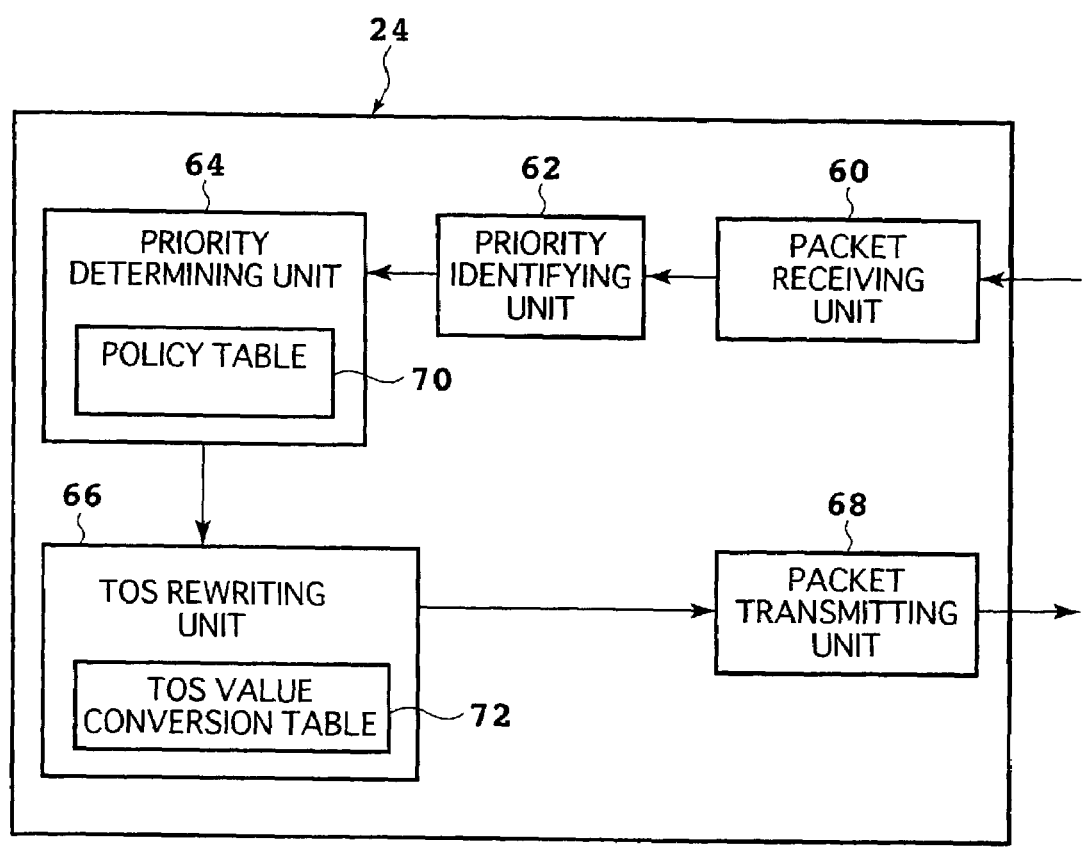
FIG. 7 is a diagram of a configuration of a relay apparatus in FIG. 2.
Figures 8, 9:
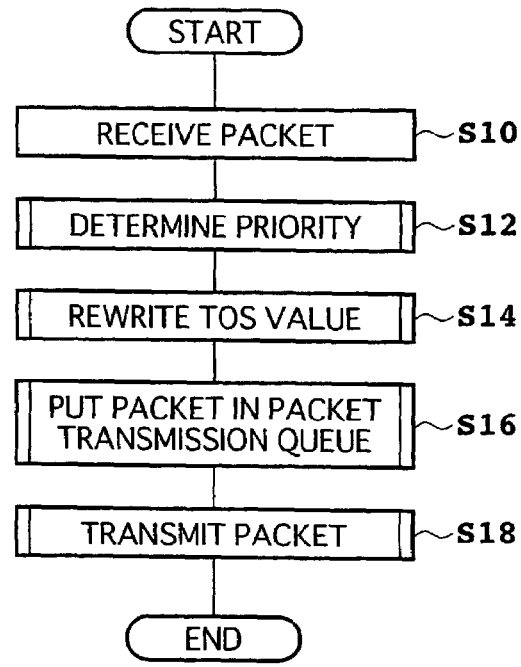
FIG. 8 is a flowchart of packet priority control.
FIG. 9 is a diagram of a TOS value conversion table in FIG. 7.

FIG. 7 is a block diagram of the relay apparatus 24 in FIG. 2. As shown in FIG. 7, the relay apparatus 24 has a packet receiving unit 60, a priority determining unit 64, a TOS rewriting unit 66, and a packet transmitting unit 68. FIG. 8 is a flowchart of priority control. At a step S10, the packet receiving unit 60 receives a packet from a communication cable not shown in the figure, and then outputs the packet to a priority identifying unit 62. At a step S12, the priority identifying unit 62 and the priority determining unit 64 determine priority as follows. The priority identifying unit 62 determines whether a priority is set in data described in the XML format at the application level of the packet. When a priority is set, the priority identifying unit 62 outputs the priority to the priority determining unit 64.

When a priority is not set, the priority is identified as follows. (i) When the priority is implicitly set by the client 20 or the server 22, the priority identifying unit 62 searches a table storing relations between source IP addresses/destination IP addresses of packets and priority, thereby identifies the priority, and then outputs the priority to the priority determining unit 64. Conceivable as examples of the packets are packets having specific source IP addresses, such as a packet accessed by a person in charge of the Internet sale for security measures (for registration of a person with whom business is to be stopped and the like), and packets having specific IP addresses, such as a packet directed to a 110 emergency server or the like. (ii) When the priority is explicitly set, the priority is assumed to be omitted, and the lowest priority is outputted to the priority determining unit 64. Consideration is given to the priority set by such different methods because the relay apparatus 24 conceivably receives not only packets related to the Internet mail order but also various other packets.

The priority determining unit 64 has the following functions.

(1) The priority determining unit 64 refers to a policy table 70 to determine a priority of the packet based on policy. The policy table 70 is provided to determine not only the priority at the application level but also a priority based on a dynamic or static policy. A priority packet is transferred through the Internet/intranet 28 shared by all users before a non-priority packet. Unlimited sending of priority packets by a user is therefore unfair to other users. Thus, another priority than the priority set at the application level is determined on the basis of the dynamic or static policy.

The policy table 70 has priorities set on the basis of the dynamic/static policy. Set as priorities based on the static policy are priority of each source IP address/destination IP address, and priorities of a protocol identifiable in lower layers (layers 2 to 4) of FNA or the like and a protocol type identifiable in an upper layer (layer 7) such as the SOAP. The SOAP is added in order to include a protocol identifiable in the upper layer. In this case, a tag different from that of the priority set at the application level is used. In the case of priority based on the dynamic policy, the policy is varied with changes in status (mainly status of the network). For example, when "Mr. A is in charge of the Internet sale on Monday, Tuesday, and Wednesday, and Mr. B is in charge of the Internet sale on Thursday, Friday, Saturday, and Sunday," a packet transmitted by Mr. A is given the highest priority on Monday, Tuesday, and Wednesday, and a packet transmitted by Mr. B is given the highest priority on Thursday, Friday, Saturday, and Sunday. Thus, the policy is changed according to a day of the week.

(2) The priority determining unit 64 calculates a priority (third priority) from the priority (first priority) at the application level outputted from the priority identifying unit 62 and the priority (second priority) calculated on the basis of the policy table 70, and then outputs the third priority to the TOS rewriting unit 66. The third priority is an addition value or an average value of the first and second priorities, for example.

At a step S14, the TOS rewriting unit 66 refers to a TOS value conversion table 72 to calculate a TOS value corresponding to the third priority outputted from the priority determining unit 64, and thereby rewrites the TOS value of the IP header. At a step S16, the TOS rewriting unit 66 puts the packet in a packet transmission queue corresponding to the third priority/TOS value. When routing is necessary at this point, the packet is routed according to the destination IP address.

Figure 10:
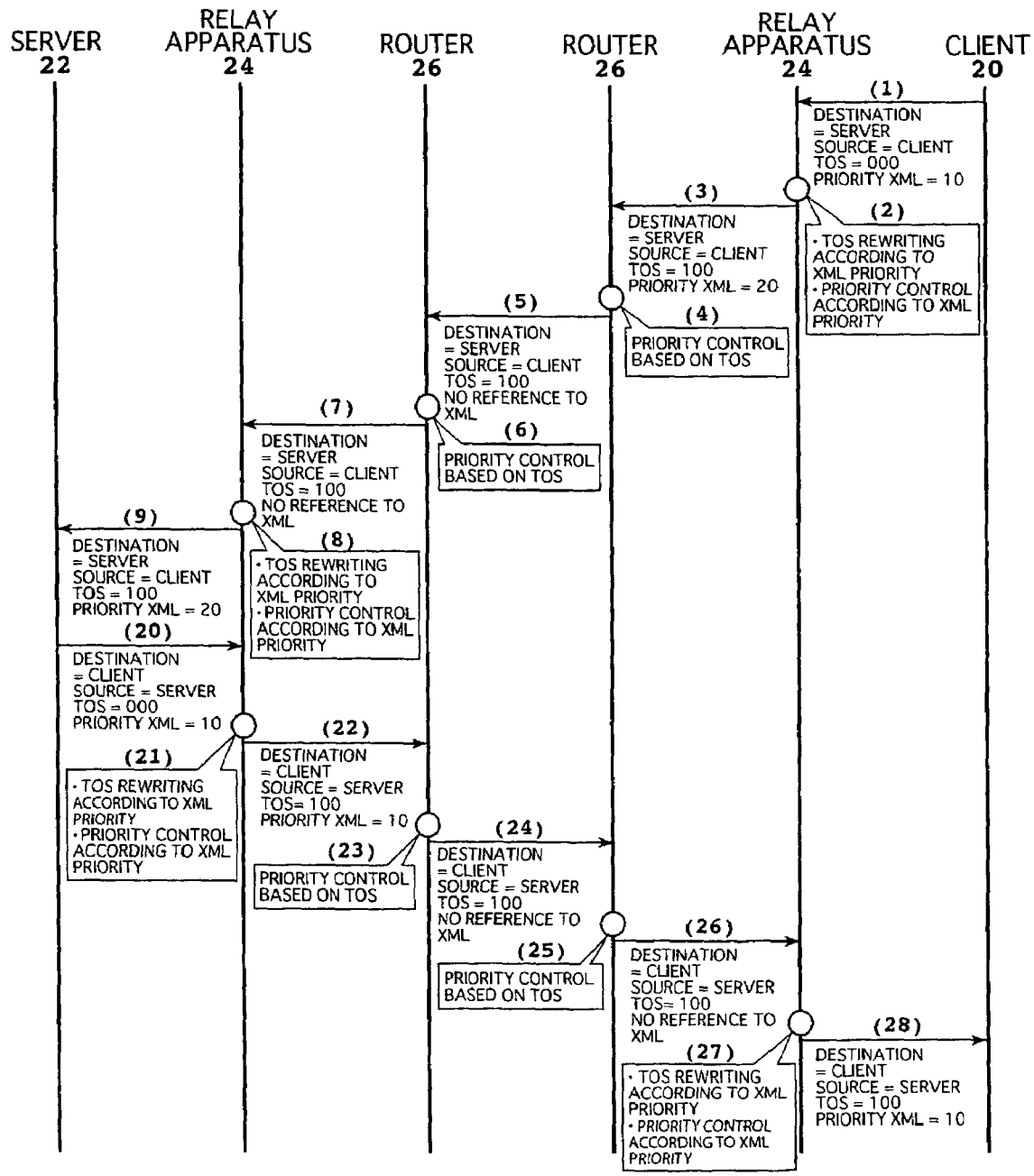
FIG. 10 is a time chart illustrating control of priority transfer of a packet.

FIG. 9 is a diagram of the TOS value conversion table 72 in FIG. 7. The TOS value conversion table 72 stores correspondences between the third priority and the TOS value. The TOS value conversion table 72 for example stores priority points 0 to 5 as TOS=1, priority points 6 to 10 as TOS=2, priority points 11 to 15 as TOS=3, priority points 16 to 20 as TOS=4, priority points 21 to 25 as TOS=5, priority points 26 to 30 as TOS=6, and priority points 31 to 35 as TOS=7. At a step S18, the packet transmitting unit 68 effects transfer control on the packet put in the packet transmission queue by the TOS rewriting unit 66 according to the third priority, and then transmits the packet. The router 26 performs the following processing. (1) Routing the packet according to the destination IP address of the packet. (2) Controlling priority transfer of the packet according to the TOS value of the packet, and transmitting the packet to a line. The Internet/intranet 28 includes the routers 26 for the routing and priority control of the packet according to the destination IP address and the TOS value of the packet. Operation of FIG. 2 will be described in the following by taking a case of Internet mail order as an example. FIG. 10 is a sequence chart illustrating control of priority transfer of a packet.

(1) Shopping Product Reference

The client 20 generates a packet formed by application data including data describing a priority of 10 and a request for shopping product reference in the XML format, a TCP header, an IP header and a MAC header including the address of the client 20 as a source address and the address of the server 22 as a destination address, and then transmits the packet, as shown in (1) in FIG. 10. When receiving the packet, the relay apparatus 24 rewrites the TOS of the IP header of the packet according to the XML priority, as shown in (2). In this case, the XML priority of the packet=10, and the server 22/client 20 at the source address/destination address being a platinum user, a priority of the packet based on the policy is 10. The relay apparatus 24 adds the priority XML=10 and the priority of 10 based on the policy to each other, thereby calculates a priority of 20, and obtains a TOS value=100 corresponding to the priority of 20. The relay apparatus 24 performs priority control according to the XML priority, as shown in (2), and transmits the packet with the destination=the server 22, the source=the client 20, the TOS=100, and the priority XML=20, as shown in (3).

The packet is received by the router 26. The router 26 performs priority control based on the TOS without referring to the priority XML, as shown in (4), and transmits the packet with the destination=the server 22, the source=the client 20, the TOS=100, and the XML priority=20, as shown in (5). The packet is transmitted through the Internet/intranet 28, and then received by the router 26. The router 26 performs priority control based on the TOS, as shown in (6), and transmits the packet with the destination=the server 22, the source=the client 20, the TOS=100, and the XML priority=20, as shown in (7). The packet is received by the relay apparatus 24. The relay apparatus 24 performs TOS rewriting and priority control according to the priority XML, as shown in (8), and transmits the packet as shown in (9). The packet requesting shopping product reference is received by the server 22.

When receiving the packet requesting shopping product reference, the server 22 generates a packet formed by application data including data describing a priority of 10 and shopping product information in the XML format, a TCP header, an IP header and a MAC header including the address of the server 22 as a source address and the address of the client 20 as a destination address, and then transmits the packet, as shown in (20). When receiving the packet, the relay apparatus 24 performs TOS rewriting and priority control according to the XML priority, as shown in (21), and transmits the packet in which the address of the destination is that of the client 20, the address of the source is that of the server 22, and TOS=100 and XML priority=10 are set, as shown in (22). The routers 26 perform priority control based on the TOS, as shown in (23) and (25), and transmit the packet as shown in (24) and (26). The relay apparatus 24 performs TOS rewriting and priority control according to the XML priority, as shown in (27), and transmits the packet as shown in (28). The client 20 receives the product information packet.

(2) Shopping Order

In this case, XML priority=20, and priority based on the policy=10, whereby TOS corresponding to the priority of 30=6=110. Otherwise, the case (2) is the same as the case (1).

(3) Others

In this case, XML priority=0, and priority based on the policy=10, whereby TOS corresponding to the priority of 10=2=010. Otherwise, the case (3) is the same as the case (1).

The embodiment described above provides the following effects.

(i) Since priority can be set more finely by SE and other user applications, end-to-end priority transfer can be realized readily and finely.

(ii) End-to-end priority transfer can be readily realized without changing the implementation of many routers.

(iii) Even when all servers/clients add the same high priority, the policy enables the priority to be made higher or lower. Therefore, it is possible to realize better priority control.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A relay apparatus for relaying a packet, said relay apparatus comprising:
    a packet receiving unit for receiving a packet;
    a priority identifying unit for determining whether or not a priority is set in application data at an application level from said packet received by said packet receiving unit, and thereby identifying a first priority at said application level;
    a priority control unit for renewing a field value for packet priority control of said packet, the header being at a level lower than said application level, on the basis of said first priority; and
    a packet transmitting unit for transmitting said packet;
    wherein said priority control unit has a policy table in which a second priority is set for each source address or each destination address, searches said policy table for a source address or a destination address of said packet to determine a corresponding second priority, calculates a third priority from the second priority and the first priority of said packet, and sets a Type of Service (TOS) field value corresponding to the third priority in a TOS field.

2. A relay apparatus as set forth in claim 1,
    wherein said priority control unit puts a packet in a packet transmission queue corresponding to said third priority, and said packet transmitting unit transmits the packet put in said packet transmission queue on the basis of said third priority corresponding to said packet transmission queue.

3. A relay apparatus as set forth in claim 1, further including a plurality of transmission buffers corresponding to said third priority,
    wherein said priority control unit writes packets to the transmission buffers corresponding to said third priority, and said packet transmitting unit performs priority control on the packets written to said transmission buffers.

4. A relay apparatus for relaying a packet, said relay apparatus comprising:
    a packet receiving unit for receiving a packet;
    a priority identifying unit for determining whether or not a priority is set in application data at an application level from said packet received by said packet receiving unit and thereby identifying a first priority at said application level;
    a priority control unit for renewing a field value for packet priority control in a header of said packet, the header being at a level lower than said application level, on the basis of said priority; and
    a packet transmitting unit for transmitting said packet;
    wherein said priority control unit determines a second priority on the basis of a type of protocol of a packet, calculates a third priority from the second priority and the first priority at the application level of the packet, and sets a Type of Service (TOS) value corresponding to the third priority in a TOS field.

5. A communication system including a communication apparatus and a relay apparatus, said communication system comprising:
    a first packet receiving unit disposed in said communication apparatus for receiving a packet;
    an application data generating unit disposed in said communication apparatus for generating application data including data at an application level and a priority at said application level corresponding to importance of the data;
    a lower-level packet generating unit disposed in said communication apparatus for generating a packet by adding to said application data a header including a destination address and a source address at a level lower than said application level;
    a first packet transmitting unit disposed in said communication apparatus for transmitting said packet;
    a second packet receiving unit disposed in said relay apparatus for receiving said packet transmitted from said communication apparatus;
    a priority identifying unit disposed in said relay apparatus for determining whether a priority is set in said application data of said packet received by said second packet receiving unit, and thereby identifying a first priority at said application level;
    a priority control unit disposed in said relay apparatus for renewing a Type of Service (TOS) field value in the header of said packet, the header being at the level lower than said application level, on the basis of said first priority; and
    a second packet transmitting unit disposed in said relay apparatus for transmitting said packet.

6. A communication apparatus as set forth in claim 5, wherein said priority is described in an XML format.

* * * * *